US009453585B2

(12) United States Patent
Sato et al.

(10) Patent No.: US 9,453,585 B2
(45) Date of Patent: Sep. 27, 2016

(54) ELECTROMAGNETIC LINEAR VALVE

(75) Inventors: Kei Sato, Kasugai (JP); Masaki Nanahara, Toyota (JP); Katsuhiro Kanamori, Miyoshi (JP); Masakuni Suzuki, Toyota (JP); Takeshi Ishida, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 2 days.

(21) Appl. No.: 14/351,743

(22) PCT Filed: Nov. 4, 2011

(86) PCT No.: PCT/JP2011/075465
§ 371 (c)(1),
(2), (4) Date: Apr. 14, 2014

(87) PCT Pub. No.: WO2013/065179
PCT Pub. Date: May 10, 2013

(65) Prior Publication Data
US 2014/0291564 A1    Oct. 2, 2014

(51) Int. Cl.
*F16K 31/02*    (2006.01)
*H01F 3/00*    (2006.01)
(Continued)

(52) U.S. Cl.
CPC ........ *F16K 31/0696* (2013.01); *F16K 31/0655* (2013.01); *B60T 8/367* (2013.01); *H01F 2007/086* (2013.01)

(58) Field of Classification Search
CPC ............... B60T 8/367; F16K 31/0655; F16K 31/0696; H01F 2007/086
USPC ................ 251/129.02, 129.15; 335/261, 279
See application file for complete search history.

(56) References Cited

U.S. PATENT DOCUMENTS 5,513,832 A * 5/1996 Becker ................ F16K 31/0624
137/82
5,879,060 A * 3/1999 Megerle ................ B60T 8/363
251/129.02
(Continued)

FOREIGN PATENT DOCUMENTS

JP    2001-260843    9/2001
JP    WO 2011077506 A1 *    6/2011    .............. B60T 8/367
(Continued)

OTHER PUBLICATIONS

International Search Report issued Feb. 7, 2012, in PCT/JP11/075465 filed Nov. 4, 2011.

*Primary Examiner* — John K Fristoe, Jr.
*Assistant Examiner* — Seth W Mackay-Smith
(74) *Attorney, Agent, or Firm* — Oblon, McClelland, Maier & Neustadt, L.L.P

(57) ABSTRACT

An electromagnetic linear valve which can effectively suppress a self-excited oscillation of a plunger is provided. A resilient member 64 urges a plunger 22 in a direction in which the core-opposing portions 70, 78 move away from a core portion 28, and moves the plunger 22 in a direction in which the core-opposing portions 70, 78 approach the core portion 28 in the case where an electric current is supplied to a coil 24. In the case where no electric current is supplied to the coil 24, a radially opposing surface area Sr as a surface area of portions of the core-opposing portions 70, 78 which respectively oppose inner peripheral surfaces of recessed portions 74, 76 is smaller than an axially opposing surface area St as a surface area of portions of the core-opposing portions 70, 78 which respectively oppose bottom surfaces of the recessed portions 74, 76, and the radially opposing surface area Sr becomes larger than the axially opposing surface area St in the case where an electric current is supplied to the coil 24 and the core-opposing portions 70, 78 approach most to the core portion 28.

10 Claims, 11 Drawing Sheets

(51) Int. Cl.
  *H01F 7/16*    (2006.01)
  *F16K 31/06*   (2006.01)
  *H01F 7/08*    (2006.01)
  *B60T 8/36*    (2006.01)

(56) References Cited

U.S. PATENT DOCUMENTS

| | | | | |
|---|---|---|---|---|
| 6,268,784 B1 * | 7/2001 | Feigel | ............ | B60T 8/363 |
| | | | | 251/129.15 |
| 6,877,717 B2 * | 4/2005 | Collins | ............ | B60T 8/363 |
| | | | | 251/129.15 |
| 6,994,406 B1 * | 2/2006 | Krawczyk | ............ | B60T 8/363 |
| | | | | 251/129.02 |
| 7,047,763 B2 * | 5/2006 | Hirota | ............ | F16K 31/0651 |
| | | | | 251/129.15 |
| 7,341,320 B2 * | 3/2008 | Otsuka | ............ | B60T 8/3615 |
| | | | | 303/119.2 |
| 7,626,288 B2 * | 12/2009 | Protze | ............ | H01F 3/14 |
| | | | | 335/209 |
| 7,750,772 B2 * | 7/2010 | Hagen | ............ | H01F 7/1607 |
| | | | | 251/129.16 |
| 7,871,056 B2 * | 1/2011 | Kratzer | ............ | B60T 8/363 |
| | | | | 251/129.02 |
| 8,939,430 B2 * | 1/2015 | Nanahara | ............ | B60T 8/367 |
| | | | | 251/129.15 |
| 2006/0163511 A1 * | 7/2006 | Trautmann | ............ | B60T 8/36 |
| | | | | 251/129.15 |
| 2008/0272322 A1 * | 11/2008 | Mayr | ............ | F16H 61/0251 |
| | | | | 251/129.15 |

FOREIGN PATENT DOCUMENTS

| | | |
|---|---|---|
| JP | 2011-133064 A | 7/2011 |
| JP | 2013-96543 | 5/2013 |
| WO | WO 2008/110436 A1 | 9/2008 |
| WO | WO 2008/110437 A1 | 9/2008 |

* cited by examiner (a) $Sr/S_A = 0.1$ (b) $Sr/S_A = 0.28$ (c) $Sr/S_A = 0.37$ (d) $Sr/S_A = 0.46$

RATIO OF AXIALLY OPPOSING SURFACE AREA

RATIO OF AXIALLY OPPOSING SURFACE AREA

ELECTROMAGNETIC LINEAR VALVE

TECHNICAL FIELD

The present invention relates to an electromagnetic linear valve configured to be capable of controlling an amount of opening of the valve continuously in accordance with an electric current supplied thereto.

BACKGROUND ART

In Patent Literature 1 given below describes a liquid pressure control valve apparatus for controlling a liquid pressure of a brake cylinder and configured to include an electromagnetic linear valve capable of controlling an amount of opening of the valve continuously. The electromagnetic linear valve includes a configuration provided with (a) a housing the interior of which is partitioned into a first liquid chamber and a second liquid chamber by a partitioning member formed with a communicating hole which communicates the first liquid chamber and the second liquid chamber, the housing being configured to be filled with working fluid, and (b) a plunger having one end functioning as a valve body, the plunger being disposed in the second liquid chamber so as to be movable in an axial direction such that the movement of the plunger in the axial direction causes the one end to close an opening of the communicating hole which functions as a valve seat and communicates with the second liquid chamber. The electromagnetic linear valve provided with the plunger and the housing prohibits a flow of the working fluid from a high-pressure side working fluid channel (first liquid chamber) to a low-pressure side working fluid channel (second fluid chamber) in a state in which the valve body closes the valve seat, and allows the flow of the working fluid from the high-pressure side working fluid channel to the low-pressure side working fluid channel in a state in which there is a clearance between the valve body and the valve seat. In addition, the linear valve is further provided with a resilient member configured to urge the plunger in one of directions in which the valve body moves toward and away from the valve seat and a coil configured to generate a magnetic field for moving the plunger in a direction opposite to the direction in which the resilient member urges the plunger. Thus, controlling an amount of power distribution to the coil can control the amount of opening of the valve, in other words, a differential pressure between a liquid pressure of the working fluid in the high-pressure side working fluid channel (may be referred to as "high-pressure-side working fluid pressure" hereinafter) and a liquid pressure of the working fluid in the low-pressure-side working fluid channel (may be referred to as "low-pressure-side working fluid pressure" hereinafter).

CITATION LIST

Patent Literature
  PTL 1: JP-A-2001-260843

SUMMARY OF INVENTION

Technical Problem
  In the electromagnetic linear valve having the configuration as described above, the plunger is supported by the resilient member in the housing, and hence a self-excited oscillation may occur in association with opening and closing operation of the valve. There are various considerable causes of occurrence of the self-excited oscillation of the plunger, and for example, an action of the working fluid flowing from the high-pressure side working fluid channel into the housing on the plunger is considered to be one of the causes of occurrence of the self-excited oscillation. In view of such circumstances, it is an object of the present invention to provide an electromagnetic linear valve which can effectively suppress the self-excited oscillation of the plunger.
Solution to Problem
  In order to solve the above-described problem, an electromagnetic linear valve of a first invention is characterized in that a resilient member urges a plunger in a direction in which a core-opposing portion moves away from a core portion, and the plunger moves in a direction in which the core-opposing portion approaches the core portion, when an electric current is supplied to a coil, and an radially opposing surface area, which is a surface area of portions of the core-opposing portions opposing inner peripheral surfaces of recessed portions is smaller than an axially opposing surface area, which is a surface area of portions of the core-opposing portions opposing bottom surfaces of the recessed portions in the case where no electric current is supplied to the coil, and the radially opposing surface area becomes larger than the axially opposing surface area in the case where the electric current is supplied to the coil and the core-opposing portions approach most to the core portions. The electromagnetic linear valve of a second invention is characterized in that at least one of the core portion and the core-opposing portion includes a different-clearance portion having a configuration in which a radial clearance between an inner peripheral surface of the recessed portion and an outer peripheral surface of the core-opposing portion is different from a clearance of other portions.
(Advantageous Effects of the Invention)
  In the electromagnetic linear valve of the first invention, the radially opposing surface area is relatively large in a movable range of the plunger, and a radial (the direction at a right angle to the direction of the axial line) component of a force generated in the plunger by a magnetic flux formed by the coil is relatively large. That is, according to the electromagnetic linear valve of the first invention, a friction force generated between the housing and the plunger is relatively large, and the large friction force can effectively suppress the self-excited oscillation of the plunger. In the electromagnetic linear valve of the second invention, the valve has portions where the magnitudes of the radial components of forces generated between the core portion and the core-opposing portion on the right side and the left side of the axial line are different from each other by the presence of the different-clearance portion. That is, according to the electromagnetic linear valve of the second invention, the plunger may be inclined in a certain direction in the housing, and hence the stabilized friction force between the plunger and the housing may be stabilized, and the stabilized friction force can effectively suppress the self-excited oscillation of the plunger.
(Forms of the Invention)
  There will be described various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of the various forms and the embodiment. It is to he further understood that any form in which one or more elements is/are added to or deleted from any one of the following forms may be considered as one form of the claimable invention.

Form (1) given below is not a claimable invention and is a form indicating a configuration which may be a presupposition of the claimable invention, and a form in which a technical characteristic described in any one of forms described later is added to Form (1) corresponds to the claimable invention.

(1) An electromagnetic linear valve including:

a housing including: (A) a partitioning member configured to partition the interior of the housing into a first liquid chamber and a second liquid chamber and being formed with a communicating hole communicating the first liquid chamber and the second liquid chamber with each other; (B) an inlet you communicating with the first liquid chamber and configured to allow working fluid to flow into the first liquid chamber; and (C) an outlet port communicating with the second liquid chamber to allow the working fluid to flow out from the second liquid chamber;

a plunger disposed in the second liquid chamber and movable in an axial direction such that one end of the plunger is seated in an opening of the communicating hole;

a resilient member configured to urge the plunger in one of a direction in which the one end approaches the opening of the communicating hole and a direction in which the one end is moved away from the opening;

a coil disposed around the housing and configured to generate a magnetic field for moving the plunger in a direction opposite to a direction in which the plunger is urged by the resilient member, wherein the housing includes a core portion formed of a ferromagnetic material and defining part of the second liquid chamber, and the plunger includes a core-opposing portion opposing the core portion and allowing a magnetic flux to flow between the core portion and the core-opposing portion.

As described before, this form represents a configuration which forms a presupposition of the claimable invention. That is, basic components of the electromagnetic linear valve of the claimable invention are listed in this form.

(2) The electromagnetic linear valve according to Form (1), wherein the resilient member urges the plunger in the direction in which the one end approaches the opening of the communicating hole.

The electromagnetic linear valve described in this form is limited to a normally closed electromagnetic linear valve. The frequency of occurrence of the self-excited oscillation of the plunger is generally known to be higher in the case of the normally closed electromagnetic linear valve in comparison with a normally opened electromagnetic linear valve. Therefore, by adding a configuration of suppressing the self-excited oscillation of the plunger to the electromagnetic linear valve described in this form, an effect of suppressing the self-excited oscillation is sufficiently utilized.

(3) The electromagnetic linear valve according to Form (1) or (2) wherein the resilient member is configured to urge the plunger in a direction in which the core-opposing portion moves away from the core portion, and allow the plunger to move in a direction in which the core-opposing portion approaches the core portion against an urging force of the resilient member when an electric current is supplied to the coil.

This form has a configuration in which when the electric current is supplied to the coil, the core portion attracts the core-opposing portion of the plunger by the magnetic field generated thereby. In the description given below, in the case where the electromagnetic linear valve has the configuration in this form, it is considered that the core portion generates a force of attracting the core-opposing portion of the plunger, and that force may be referred to as a suction force.

(4) The electromagnetic linear valve according to any one of Forms (1) to (3), wherein one end portion of the housing which partitions the second liquid chamber on an opposite side from a portion partitioned by the partitioning member functions as the core portion, and the other end of the plunger on an opposite side thereof from the one end functions as the core-opposing portion.

This form is a form in which positions where the core portion and the core-opposing portion are provided are specified. This form is a form in which a configuration for causing the core portion to attract the plunger in the case where the resilient member urges the plunger in a direction to seat, in other words, in a normally closed valve is specified.

(5) The electromagnetic linear valve according to Form (4), wherein the housing includes (a) a housing body fanned of a ferromagnetic material and formed into a cylindrical shape, (b) a closing member formed of a ferromagnetic material, provided so as to close one end of the housing body to form the one end portion of the housing, and functions as the core portion, and (c) a coupling member formed of a non-magnetic material into a cylindrical shape, and configured to couple the housing body and the closing member with a distance secured between the housing body and the closing member by allowing the housing body to be fitted to one end thereof and the closing member to be fitted to the other end thereof.

This form specifies a configuration of the housing for achieving a configuration in which the core portion attracts the plunger in the normally closed valve. A cylindrical member closed on top is used for the housing of the electromagnetic linear valve of the related art, and is partly reformed to have a non-magnetic property in an annular shape, so that a lid portion of the member is caused to function as the core portion. However, the housing having such a configuration is subjected to variation in size of the portion to be reformed to have a non-magnetic property. In other words, since there arises the variation in size of the core portion, a surface area opposing thereto varies correspondingly, for example, when the core portion and the core-opposing portion are radially opposed each other. In contrast, according to this form, the core portion having a size almost as designed may be produced, as described later in detail, when the surface area where the core portion and the core-opposing portion radially oppose each other is set to a certain design value, the surface area can be formed with high degree of accuracy.

(6) The electromagnetic linear valve according to any one of Forms (1) to (3), wherein the housing includes a small diameter portion having an inner diameter smaller than other portions at a radially midsection of a portion where the second liquid chamber is partitioned, the plunger is disposed in the housing in a state in which the plunger penetrates through the small diameter portion, and the other end of the plunger, which is an end thereof opposite to the one end, is formed with a flange projecting radially outward and having an outer diameter larger than the inner diameter of the small diameter portion, and the small diameter portion functions as the core portion, and the flange functions as the core-opposing portion.

This form is a form in which positions where the core portion and the core-opposing portion are provided are specified. This form is a form in which a configuration for causing the core portion to attract the plunger in the case where the resilient member urges the plunger in a direction to move away from a valve seat, in other words, in a normally opened valve is specified.

(11) The electromagnetic linear valve according to any one of Forms (1) to (6), wherein the core portion includes a recessed portion which allows the core-opposing portion to face and enter therein, the core-opposing portion opposes a bottom surface of the recessed portion and opposes an inner peripheral surface of the recessed portion, the resilient member is configured to urge the plunger in the direction in which the core-opposing portion moves away from the core portion, and allow the plunger to move in the direction in which the core-opposing portion approaches the core portion against the urging force of the resilient member when the electric current is supplied to the coil, and an outer peripheral surface of the core-opposing portion has a portion opposing the inner peripheral surface of the recessed portion, and an axially extending portion of the core-opposing portion has a portion opposing an axially extending surface of the recessed portion, and an axially opposing surface area which is a surface area of the portion of the outer peripheral surface of the core-opposing portion is smaller than an axially opposing surface area which is a surface area of the portion of the axially extending surface of the core-opposing portion in the case where no electric current is supplied to the coil, and the radially opposing surface area becomes larger than the axially opposing surface area in the case where an electric current is supplied to the coil and the core-opposing portion approaches most to the core portion.

The electromagnetic linear valve described in this form is configured such that the inner peripheral surface of the recessed portion of the core portion and the outer peripheral surface of the core-opposing portion always face each other irrespective of the position of the plunger with respect to the housing. The electromagnetic linear valve of this form has a configuration in which the core portion attracts the plunger by supplying an electric current to the coil, and the core-opposing portion enters the recessed portion by increasing the electric current to the coil. In other words, the electromagnetic linear valve of this form has a configuration in which the radially opposing surface area increases with increase in electric current to the coil.

In the electromagnetic linear valve of the related art, in order to cause the force of the core portion attracting the core-opposing portion to act on the plunger efficiently, and the radially opposing surface area is set to he small and is set to almost zero in the case where no electric current is supplied to the coil. The electromagnetic linear valve generally has a configuration in which the axially movable range of the plunger is relatively small, and the radially opposing surface area does not increase much even in the case where the core-opposing portion approaches most to the core portion from a state in which the radially opposing surface area is almost zero in the case where no electric current is supplied to the coil. In contrast, the electromagnetic linear valve of this form is characterized in that the radially opposing surface area becomes larger than the axially opposing surface area in the case where the core-opposing portion approaches most to the core portion. As described above, since the axially movable range of the plunger is relatively small, the radially opposing surface area is relatively large even in the case where no electric current is supplied to the coil by configuration that the radially opposing surface area becomes larger than the axially opposing surface area in the case where the core-opposing portion approaches most to the core portion. That is, according to the electromagnetic linear valve of this form, a relatively large radial (a direction at a right angle to the axial direction) component of a magnetic force generated between the core portion and the plunger may be achieved by daring to increase the radially opposing surface area. That is, according to the electromagnetic linear valve of this form, a friction force generated between the housing and the plunger is relatively large, and the large friction force can effectively suppress the self-excited oscillation of the plunger.

The terms "radially opposing surface area" and "axially opposing surface area" descried in this form correspond to a surface area where a magnetic flux practically flows when an electric current is passed to the coil. For example, in the case where the inner peripheral surface of the recessed portion has a stepped shape as described later, the magnetic flux is liable to flow between the outer peripheral surface of the core-opposing portion and the inner peripheral surface of the recessed portion of the core portion, specifically, a step having a smaller radial clearance with respect to the core-opposing portion among a plurality of steps formed in the recessed portion. That is, in this case, an axially lapped surface area of the outer peripheral surface of the core-opposing portion with respect to the step having a radially smallest clearance corresponds to the "radially opposing surface area". The term "radially extending surface" described in this form means a surface at a right angle to each axial direction. That is, a radially extending surface of the core portion includes, for example, the bottom surface of the recessed portion, and in a case where the core-opposing portion is provided at an end of the plunger, the radially extending surface of the core-opposing portion includes, for example, an end surface thereof.

(12) The electromagnetic linear valve according to Form (11), wherein the radially opposing surface area occupies 25 percent or higher of a sum of the radially opposing surface area and the axially opposing surface area in the case where no electric current is supplied to the coil.

This form is a form in which a lower limit value of the radially opposing surface area in the case where no electric current is supplied to the coil is determined. As described above, in the electromagnetic linear valve of the related art, the radially opposing surface area is set to almost zero. However, in the electromagnetic linear valve described in this form, the radially opposing surface area is set to be relatively large from a position where the plunger starts to move by a power supply. That is, according to this form, a friction force depending on the radial component of the magnetic force may be generated from a moment when the plunger starts to move, thereby suppressing the self-excited oscillation of the plunger effectively. When variation or the like at the time of assembly of the electromagnetic linear valve is considered, it is further preferable that the radially opposing surface area is 30 percent or higher of a sum of the radially opposing surface area and the axially opposing surface area.

(13) The electromagnetic linear valve according to Form (12) wherein the radially opposing surface area occupies 45 percent or lower of a sum of the radially opposing surface area and the axially opposing surface area in the case where no electric current is supplied to the coil.

This form is a form in which an upper limit value of the radially opposing surface area in the case where no electric current is supplied to the coil is determined. When the radially opposing surface area is increased too much with respect to the axially opposing surface area, a static friction force is increased, and an electric current required for starting the movement of the plunger is increased. According to this form, an adequate resistance force can be applied to the plunger which starts movement without increasing an electric current for starting the movement of the plunger, and hence the self-excited oscillation of the plunger may be suppressed effectively. When variation or the like at the time of assembly of the electromagnetic linear valve is considered, it is further preferable that the radially opposing surface area is 40 percent or lower of a sum of the radially opposing surface area and the axially opposing surface area.

(14) The electromagnetic linear valve according to any one of Forms (11) to (13), wherein
the radially opposing surface area occupies 60 percent or lower of a sum of the radially opposing surface area and the axially opposing surface area in the case where an electric current is supplied to the coil and the core-opposing portion approaches most to the core portion.

This form is a form in which an upper limit of the radially opposing surface area in the case where the core-opposing portion approaches most to the core portion is determined. If the axially opposing surface area is reduced too much, an electric current required when moving the plunger in the axial direction or when holding the same at the moved position is increased. Therefore, according to this form, the plunger can be moved while applying an adequate resistance force, and hence the self-excited oscillation of the plunger may be suppressed effectively.

(15) The electromagnetic linear valve according to Forms (11) to (14), wherein the core-opposing portion is formed into a stepped shape having a large outer diameter portion and a small outer diameter portion having an outer diameter smaller than that of the large outer diameter portion, the small outer diameter portion being located on one of opposite sides of the large outer diameter portion which is nearer to the core portion,
the recessed portion of the core portion has a stepped shape and is formed with a first recessed portion and a second recessed portion having an inner diameter smaller than that of the first recessed portion, the second recessed portion being located on an opposite side of the first recessed portion from the core-opposing portion,
the electromagnetic linear valve is configured such that the large outer diameter portion faces and enters the first recessed portion, and the small outer diameter portion faces and enters the second recessed portion,
an opposed two-level surface, which is a two-level surface between the large outer diameter portion and the small outer diameter portion, opposes a two-level surface of the recessed portion, which is a two-level surface between the first recessed portion and the second recessed portion, and an end surface of the small outer diameter portion which is nearer to the core portion opposes a bottom surface of the second recessed portion, and also an outer peripheral surface of the large outer diameter portion opposes an inner peripheral surface of the first recessed portion and an outer peripheral surface of the small diameter portion opposes an inner peripheral surface of the second recessed portion in the case where no electric current is supplied to the coil,
the outer peripheral surface of the large outer diameter portion has a portion opposing the inner peripheral surface of the first recessed portion, and the outer peripheral surface of the small outer diameter portion has a portion opposing the inner peripheral surface of the second recessed portion, and the radially opposing surface area is a sum of a surface area of the portion of the outer peripheral surface of the large outer diameter portion and a surface area of the portion of the outer peripheral surface of the small outer diameter portion, and
the opposed two-level surface has a portion opposing the recessed portion two-level surface, and the end surface of the small outer diameter portion which is nearer to the core portion has a portion opposing the bottom surface of the second recessed portion, and the axially opposing surface area is a sum of a surface area of the portion of the opposed two-level surface and a surface area of the portion of the end surface of the small outer diameter portion.

The electromagnetic linear valve described in this form has a configuration in which the recessed portion formed on the core portion has a stepped shape, and the core-opposing portion also entering into the recessed portion also has a stepped shape. In such a configuration, the electromagnetic linear valve of this form has a configuration in which the components thereof are radially opposite each other at two positions, that is, the inner peripheral surface of the first recessed portion and the outer peripheral surface of the large outer diameter portion of the core-opposing portion are radially opposite each other, and the inner peripheral surface of the second recessed portion and the outer peripheral surface of the small outer diameter portion are radially opposite each other. In other words, in the electromagnetic linear valve of this form, in comparison with the electromagnetic linear valve of the related art having a single radially opposing position, the amount of increase in surface area of a portion between the plunger and the core portion where the magnetic flux flows with respect to the amount of movement of the direction in which the plunger approaches the core portion may be increased. Therefore, according to the electromagnetic linear valve of this form, occurrence of magnetic saturation between the plunger and the core portion may be suppressed. Also, according to the electromagnetic linear valve of this form, the more the plunger approaches the core portion, the more the magnetic force generated between the core portion and the plunger may be increased, so that the radial component of the magnetic force may be increased. Accordingly, the more the amount of movement of the plunger increases, the more the friction force between the housing and the plunger may be increased, and the increased friction force can effectively suppress the self-excited oscillation of the plunger.

(21) The electromagnetic linear valve according to any one of Forms (1) to (14), wherein the core portion includes a recessed portion which allows the core-opposing portion to face and enter therein,
the core-opposing portion opposes a bottom surface of the recessed portion and opposes an inner peripheral surface of the recessed portion,
at least one of the core portion and the core-opposing portion includes:
a different-clearance portion having a configuration in which a radial clearance between the inner peripheral surface of the recessed portion and the outer peripheral surface of the core-opposing portion is different from a clearance of other portions.

The electromagnetic linear valve described in this form has a configuration in which the different-clearance portion is provided, and hence there are portions at which the clearances between the inner peripheral surface of the core portion and the outer peripheral surface of the core-opposing portion are different from each other between one side and the other side with an axial line interposed therebetween in the radial direction. In other words, according to the electromagnetic linear valve of this form, since the magnitudes of the magnetic force acting when an electric current is supplied to the coil are different from each other between the one side and the other side in the radial direction, the plunger may be inclined in a certain direction in the housing. Therefore, according to the electromagnetic linear valve of this form, the friction force between the plunger and the housing may be stabilized, and hence the self-excited oscillation of the plunger may be effectively suppressed.

This form may have a configuration in which by employing one or both of the core portion and the core-opposing portion having a shape in which the distance from the axial line thereof at one portion is different from that at other portions, at least one of those may have the "different-clearance portion" described above. For example, by providing a projecting portion or a recessed portion on the inner peripheral surface of the recessed portion or the outer peripheral surface of the core-opposing portion, or by employing the recessed portion or the core-opposing portion having a cross-sectional shape in the radial direction such as oval but not a circle, at least one of the core portion and the core-opposing portion may have the different-clearance portion. In other words, this form may have the different-clearance portion having a larger or smaller clearance than other portions. From the view point of stabilization of the friction force between the plunger and the housing, it is better to stabilize the magnetic force acting on portions other than the different-clearance portion. Therefore, the different-clearance portion preferably is larger than a clearance of other portions.

(22) The electromagnetic linear valve according to Form (21) wherein each of at least one of the core portion and the core-opposing portion has a cross sectional shape that is asymmetric with respect to an axial line of said each of the at least one of the core portion and the core-opposing portion, and the cross sectional shape is taken along a plane including the axial line and the different-clearance portion.

This form is, in brief, a form in which the core portion or the core-opposing portion has an asymmetrical portion with respect to the axial line.

(23) The electromagnetic linear valve according to Form (21) or (22), wherein the different-clearance portion has a configuration in which a dimension of the circumferential direction thereof is 10 percent or higher of the inner periphery of the recessed portion when being provided on the core portion, and is 10 percent or higher of the outer periphery of the core-opposing portion when being provided on the core-opposing portion.

This form is limited in size of the different-clearance portion. When the different-clearance portion is too small with respect to the inner periphery of the recessed portion of the core portion or the outer periphery of the core-opposing portion, the difference in magnitude of the magnetic force acting when an electric current is supplied to the coil between the one side and the other side with the axial line interposed therebetween in the radial direction may be insufficient. According to this form, a sufficient difference in magnetic force to act may be generated between the one side and the other side with the axial line interposed therebetween in the radial direction, and hence the plunger may be inclined in a certain direction within the housing. The magnitude of the different-clearance portion needs to be smaller than those of other portions as a matter of course and, preferably, is 30 percent or lower of the length of the inner periphery of the recessed portion or the length of the outer periphery of the core-opposing portion.

(24) The electromagnetic linear valve according to Form (21) or (23), wherein a void portion is formed on one of the core portion and the core-opposing portion, and the void portion functions as the different-clearance portion, the different-clearance portion is a different-clearance portion having a configuration in which a radial clearance between the inner peripheral surface of the recessed portion and the outer peripheral surface of the core-opposing portion is larger than a clearance of other portions.

In this form, the core portion or the core-opposing portion has a shape like a chipped circle. The "void portion" descried in this form may be a recessed portion in the radial direction or a notch, or, a portion having a shape changed in distance from a center such as an oval. As described before, according to this form, the magnetic force applied to a portion other than the different-clearance portion is stabilized, no that the friction force between the plunger and the housing may further be stabilized.

(25) The electromagnetic linear valve according to Forms (21) to (24), wherein the core-opposing portion is formed into a stepped shape having a large outer diameter portion and a small outer diameter portion having an outer diameter smaller than that of the large outer diameter portion, the small outer diameter portion being located on one of opposite sides of the large outer diameter portion which is nearer to the core portion, the recessed portion of the core portion has a stepped shape and is formed with a first recessed portion and a second recessed portion having an inner diameter smaller than that of the first recessed portion, the second recessed portion being located on an opposite side of the first recessed portion from the core-opposing portion, and the electromagnetic linear valve is configured such that the large outer diameter portion faces and enters the first recessed portion, and the small outer diameter portion faces and enters the second recessed portion.

(26) The electromagnetic linear valve according to Form (25), wherein a void portion is formed on the inner peripheral surface of the first recessed portion of the core portion, and the void portion functions as the different-clearance portion.

(27) The electromagnetic linear valve according to Form (25), wherein a void portion is formed on the outer peripheral surface of the large outer diameter portion of the core-opposing portion, and the void portion functions as the different-clearance portion.

The above-described three forms are the electromagnetic linear valve having a configuration in which the recessed portion of the core portion and the core-opposing portion are formed into stepped shape, and in the second and third forms, the positions where the different-clearance portion is provided in the electromagnetic linear valve having such a configuration are limited.

DESCRIPTION OF EMBODIMENTS

Hereinafter, embodiments and several modifications of a claimable invention will be described in detail with reference to the drawings. This claimable invention may be implemented as the embodiments described below, and also in forms described in the above-described [Forms of Invention], as well as in various forms applied with various modifications and improvements on the basis of knowledge of those skilled in the art.

First Embodiment

<Configuration of Electromagnetic Linear Valve>

Figure 1:
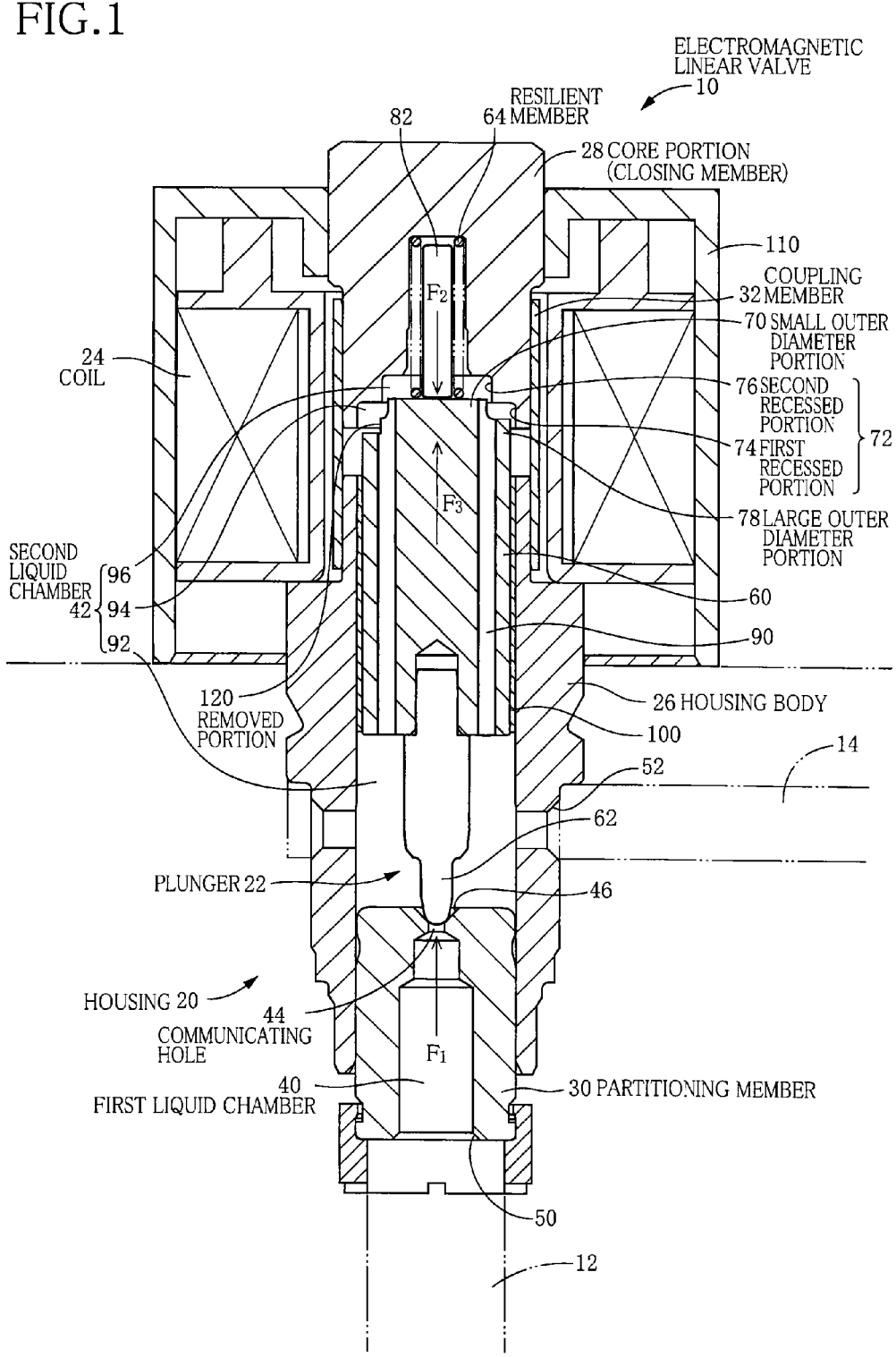
FIG. 1 is a cross-sectional front view of an electromagnetic linear valve according to a first embodiment of a claimable invention.

An electromagnetic linear valve 10 according to an embodiment of the claimable invention is illustrated in FIG. 1. The electromagnetic linear valve 10 is connected to a high-pressure-side working fluid channel 12 and a low-pressure-side working fluid channel 14, and is a so-called normally closed valve which prohibits a flow of working fluid from the high-pressure-side working fluid channel 12 to the low-pressure-side working fluid channel 14 in a normal state. Then, as described in detailed later, the electromagnetic linear valve 10 allows the flow of the working fluid from the high-pressure-side working fluid channel 12 to the low-pressure-side working fluid channel 14 and is capable of changing a differential pressure between a liquid pressure in the high-pressure-side working fluid channel 12 and a liquid pressure in the low-pressure-side working fluid channel 14 at that time so as to be controllable.

The electromagnetic linear valve 10 is provided with a hollow-shaped housing 20, a plunger 22 provided in the housing 20 so as to be movable in an axial direction, and a cylindrical coil 24 provided on the outer periphery of the housing 20 as illustrated in FIG. 1. The housing 20 includes a guide cylinder 26 formed into a substantially cylindrical shape as a housing body configured to guide the a movement of the plunger 22 in the axial direction in the interior thereof, a closing member 28 provided so as to close an upper end of the guide cylinder 26, and a valve member 30 having a cylindrical shape closed on top and fitted to a lower end portion of the guide cylinder 28. The guide cylinder 26 and the closing member 28 are formed of a ferromagnetic material, and the guide cylinder 26 and the closing member 28 are coupled by a cylindrical sleeve 32 which corresponds to a coupling member formed of a non-magnetic material. Specifically, the closing member 28 is fitted into an upper end of the sleeve 32, and the guide cylinder 26 is fitted into a lower end of the sleeve 32, and coupling is achieved in a state in which a space is provided between a lower end surface of the closing member 28 and an upper end surface of the guide cylinder 26. Although described in detail later, the closing member 28 functions as a core portion which mainly generates a suction force, which is a force of attracting the plunger 22. In the following description, the closing member 28 may be referred to as a core 28.

The valve member 30 partitions the interior of the housing 20 into a first liquid chamber 40 and a second liquid chamber 42, and functions as a partitioning member of the housing 20. The valve member 30 is provided with a communicating hole 44 penetrating in the axial direction and communicating the first liquid chamber 40 and the second liquid chamber 42. An opening 46 on an upper side of the communicating hole 44 is formed into a tapered shape.

The valve member 30, in other words, the first liquid chamber 40 of the housing 20 opens downward, and an opening 50 functions as an inlet port, thereby communicating with the high-pressure-side working fluid channel 12. In contrast, the second liquid chamber 42 of the housing 20 is partitioned by the guide cylinder 26, the core 28, and the valve member 30, and an opening 52 provided in an outer wall surface of the guide cylinder 26 functions as an outlet port, whereby the second liquid chamber 42 communicates with the low-pressure-side working fluid channel 14.

The plunger 22 includes a plunger body 60 formed of a ferromagnetic material and a rod 62 formed of a non-magnetic material and fixedly fitted to a lower end of the plunger body 60. A lower end of the rod 62 is formed into a semi-spherical shape, and is directed to face the opening 46 of the communicating hole 44 formed in the valve member 30. In other words, the lower end of the rod 62 functions as a valve body, and the opening 46 of the communicating hole 44 functions as a valve seat, so that the communicating hole 44 is closed by the lower end of the rod 62 seated in the opening 46. The plunger 22 is urged in a direction away from the core 28 (downward) by a coil spring 64 disposed between the plunger 22 and the core 28. In other words, the coil spring 64 as a resilient member urges the lower end of the rod 62 in a direction approaching the opening 46 of the communicating hole 44 so as to close the communicating hole 44 by the plunger 22.

An upper end portion of the plunger body 60 is formed into a stepped shape. Specifically, the plunger body 60 is formed on an upper end thereof with a small outer diameter portion 70 having a smaller outer diameter in comparison with other portions, and hence is formed into the stepped shape. On the other hand, a lower end of the core 28 is provided with a recessed portion 72 formed into a stepped shape. Specifically, the recessed portion 72 is formed with a first portion 74 on a lower end surface of the core 28, and a second portion 76 having a smaller inner diameter than the first portion 74 is formed above the first portion 74, so that a stepped shape is formed. Then, the recessed portion 72 of the core 28 allows entry of the upper end portion of the plunger body 60. Specifically, the small outer diameter portion 70 of the plunger body 60 faces and enters the second portion 76, and a portion continuing downward of the small outer diameter portion 70 of the plunger body 60 faces and enters the first portion 74. In other words, the small outer diameter portion 70 of the plunger body 60 and a portion continuing downward of the projecting portion 70 of the plunger body 60 function as core-opposing portions and the portion continuing downward of the projecting portion 70 of the plunger body 60 is referred to as a large outer diameter portion 78 of the core-opposing portion. The electromagnetic linear valve 10 of the invention is characterized by a portion where the core 28 laps the plunger 22, and the characteristic will be described in detail later.

A bottom surface of the second portion 76 is formed with a bottomed hole 80, and the above-described coil spring 64 is arranged in the interior of the bottomed hole 80. In other words, the coil spring 64 is disposed in a state of being sandwiched between the bottom surface (the upper surface in the drawing) of the bottomed hole 80 and an upper surface of the small outer diameter portion 70 of the plunger 22. A stopper 82 is arranged inside the coil spring 64, so that the movement of the plunger 22 approaching the core 28 is restricted.

Furthermore, the plunger body 60 includes a plurality of communicating channels 90 penetrating therethrough in the axial direction and communicating an upper side and lower side thereof. Specifically, the plunger 22 is disposed in the second liquid chamber 42, and the second liquid chamber 42 includes a partitioning-member-side liquid chamber 92 formed around the rod 62 of the plunger 22, a first core portion side liquid chamber 94 formed between an upper end portion of the plunger 22 and the first portion 74, and a second core portion side liquid chamber 96 formed between the small outer diameter portion 70 of the plunger 22 and the second portion 76. Each of the plurality of communicating channels 90 described above communicates the partitioning-member-side liquid chamber 92 with the two core portion side liquid chambers 94, 96 and an end of an upper side of each of those opens both to the two core portion side liquid chambers 94, 96. That is, air bubbles entered into both of the two core portion side liquid chambers 94, 96 can be expelled to the partitioning-member-side liquid chamber 92 through the communicating channel 90.

A plunger sleeve 100 formed of a non-magnetic material into a cylindrical shape is fitted on the plunger body 60. When the plunger 22 is inclined in the housing 20 in a state in which the plunger 22 is seated, an upper end of the plunger sleeve 100 comes into abutment with an inner surface of the guide cylinder 26. In other words, the plunger 22 is configured to be supported at two points, a lower end of the plunger sleeve 100 and the lower end of the rod 62. In contrast, when the plunger 22 is inclined in the housing 20 in a state in which the plunger 22 is separated from the valve seat, the upper end and the lower end of the plunger sleeve 100 come into abutment with the inner surface of the guide cylinder 26, and the plunger 22 is supported at two points, the upper end and the lower end of the plunger sleeve 100.

The coil 24 is accommodated in a coil case 110 fixed to an outer peripheral surface of the upper portion of the housing 20. The coil case 110 is formed of a ferromagnetic material, an upper end portion thereof is fixed to the core 28, and a lower end portion thereof is fixed to the guide cylinder 26. In this configuration, a magnetic path is formed.

Figure 2:
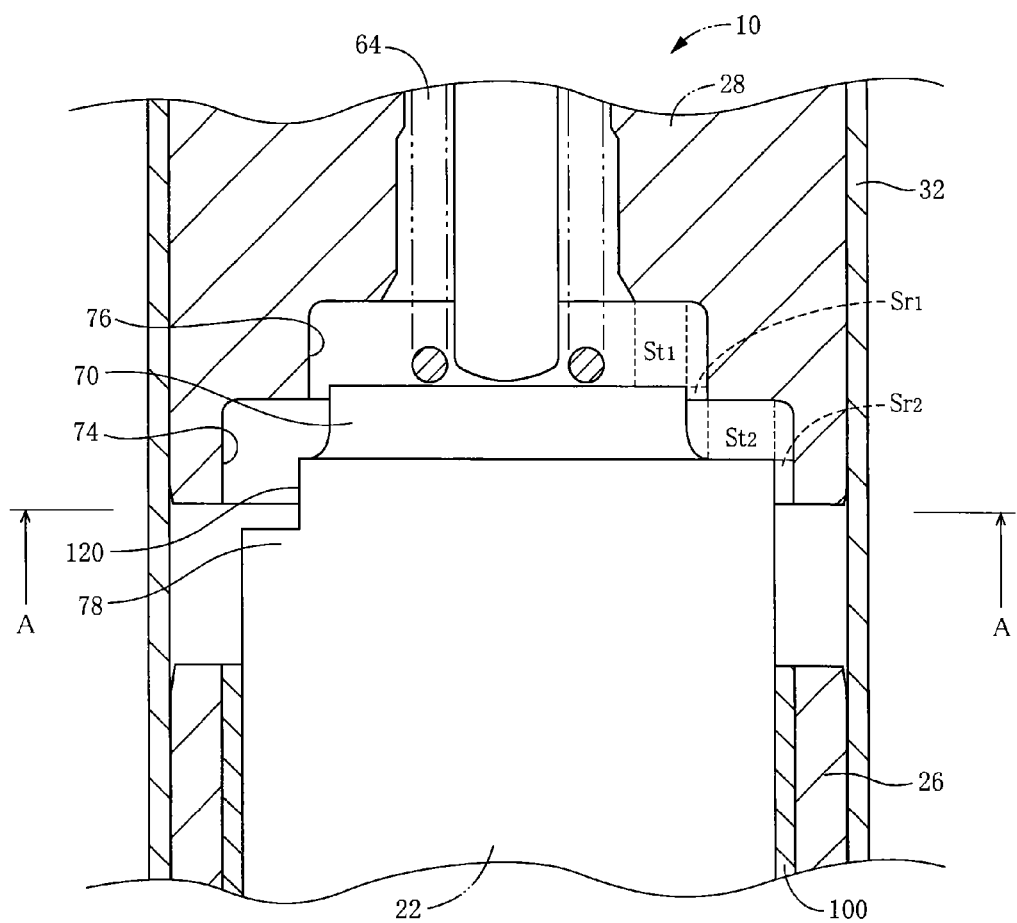
FIG. 2 is a cross-sectional view illustrating a portion in which a core portion and core-opposing portions oppose in the electromagnetic linear valve illustrated in FIG. 1 in an enlarged scale.
Figure 3:
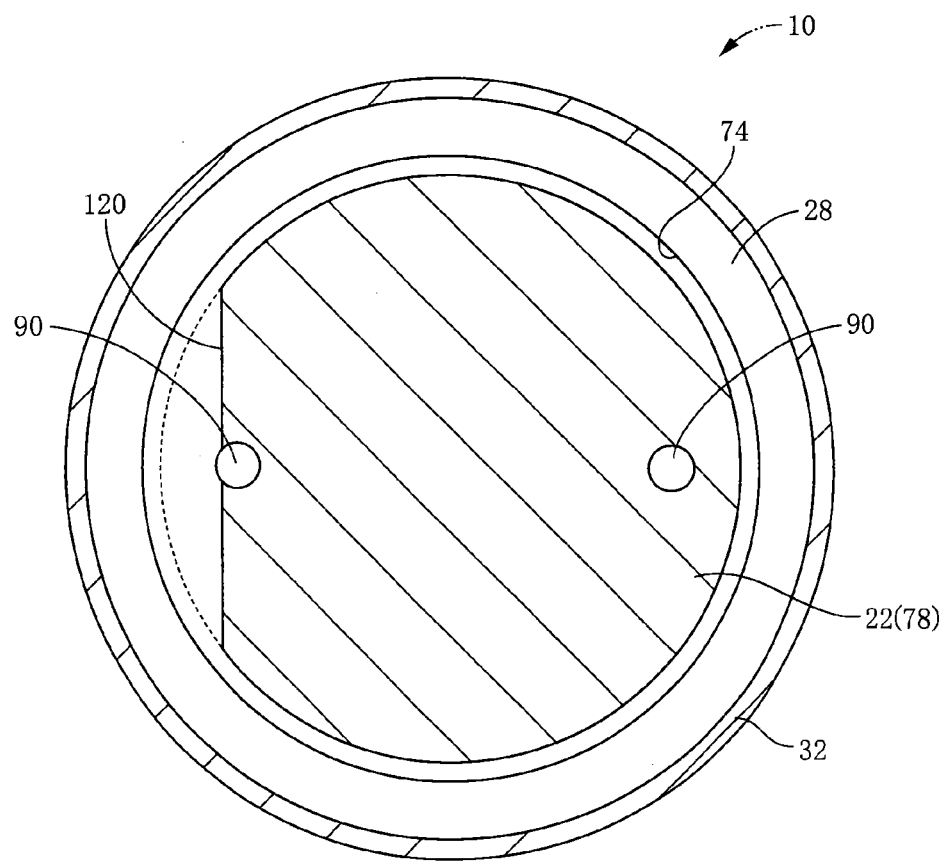
FIG. 3 is a cross-sectional plan view (an A-A cross section in FIG. 2) of the electromagnetic linear valve illustrated in FIG. 1.
Figure 4:
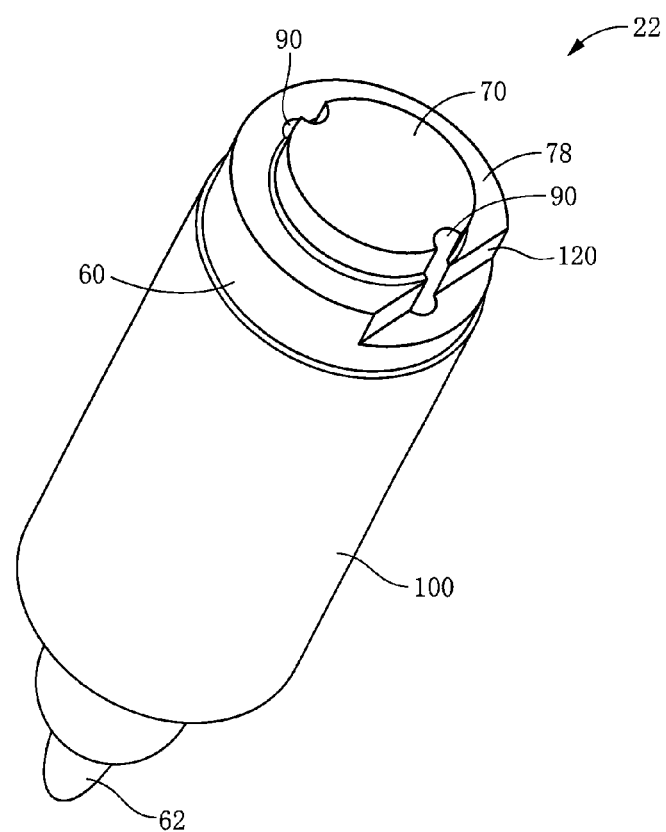
FIG. 4 is a perspective view of a plunger illustrated in FIG. 1.

Specifically, as illustrated in an enlarged cross-sectional front view in FIG. 2 and a cross-sectional plan view in FIG. 3 (A-A cross section in FIG. 2), and a perspective view of the plunger 22 in FIG. 4, in the electromagnetic linear valve 10, a void portion 120 like a portion removed from a circular shape is formed on the large outer diameter portion 78 of the plunger 22. In other words, in the electromagnetic linear valve 10, when the plunger 22 and the housing 20 are arranged coaxially, a radial clearance between an inner peripheral surface of the first portion 74 and the large outer diameter portion 78 is not equal over an entire circumference, and a part of the clearance is larger than the remaining part thereof. In other words, the core-opposing portion of the plunger 22 of the electromagnetic linear valve 10 has a clearance-different portion in which the radial clearance between the outer peripheral surface of the core-opposing portion and an inner peripheral surface of the recessed portion 72 is different from the clearance of other portion.

<Operation of Electromagnetic Linear Valve>

Subsequently, an operation of the electromagnetic linear valve 10 will be described before describing characteristics of the electromagnetic linear valve 10 of the embodiment. The electromagnetic linear valve 10 has a configuration in which the differential pressure between the liquid pressure in the high-pressure-side working fluid channel 12 and the liquid pressure in the low-pressure-side working fluid channel 14 is controllable by prohibiting a flow of working fluid from the high-pressure-side working fluid channel 12 to the low-pressure-side working fluid channel 14 when no electric current is supplied to the coil 24 and allowing the flow of the working fluid from the high-pressure-side working fluid channel 12 to the low-pressure-side working fluid channel 14 by an electric current supplied to the coil 24.

More specifically, when no electric current is supplied to the coil 24, a distal end of the rod 62 of the plunger 22 closes the opening 46 of the communicating hole 44 connected to the high-pressure-side working fluid channel 12 by a resilient force of the coil spring 64, and hence the electromagnetic linear valve 10 prohibits the flow of the working fluid from the high-pressure-side working fluid channel 12 to the low-pressure-side working fluid channel 14. In this case, a force F1 based on a difference between the liquid pressure in the high-pressure-side working fluid channel 12 (may be referred to as "high-pressure-side working fluid pressure" hereinafter), and the liquid pressure in the low-pressure-side working fluid channel 14 may be referred to as "low-pressure-side working fluid pressure hereinafter) acts on the distal end of the rod 62. The force F1 based on the pressure difference and a resilient force F2 of the coil spring 64 act in directions opposite to each other. However, since the resilient force F2 is set to be larger than the force F1 based on the pressure difference to some extent, the electromagnetic linear valve 10 is configured not to open when an electric current is not supplied to the coil 24.

In contrast, when an electric current is supplied to the coil 24, a magnetic flux passes through the coil case 110, the core 28, the plunger 22, and the guide cylinder 26 in association with generation of a magnetic field. Then, a magnetic force which encourages the distal end of the rod 62 to move the plunger 22 in the direction away from the opening 46 of the communicating hole 44 (may be referred to as "separating direction" hereinafter), in other words, in the direction to cause the upper end of the plunger 22, which is a core-opposing portion, to approach the core 28 is generated. When the electric current is supplied to the coil 24 and the magnetic field is generated, a sum of the force F1 based on the pressure difference and a three F3 by which the plunger 22 is urged upward by the magnetic force (this force may be referred to as a suction force F3 in the description given below because it is a force that the core 28 attracts the plunger 22) and the resilient three F2 of the coil spring 64 act in directions oppose to each other. While the sum of the force F1 based on the pressure difference and the suction force F3 is larger than the resilient force F2, the opening 46 closed by the distal end of the rod 62 is opened, and the working fluid flows from the high-pressure-side working fluid channel 12 to the low-pressure-side working fluid channel 14.

Then, by the flow of the high-pressure working fluid to the low-pressure-side working fluid channel 14, the low-pressure-side working fluid pressure is increased, and the force F1 based on the pressure difference is reduced. In a case where by the reduction of the force F1 based on the pressure difference, the sum of the force F1 based on the pressure difference and the suction force F3 is reduced to be smaller than the resilient force F2, the electromagnetic linear valve 10 is closed, and the flow of the working fluid from the high-pressure-side working fluid channel 12 to the low-pressure-side working fluid channel 14 is prevented. Therefore, the low-pressure-side working fluid pressure is maintained to a low-pressure-side working fluid pressure at a time point when the sum of the force F1 based on the pressure difference and the suction force F3 becomes smaller than the resilient force F2. In other words, by controlling an amount of power distribution to the coil 24, the control of the pressure difference between the low-pressure-side working fluid pressure and the high-pressure-side working fluid pressure is enabled, so that the low-pressure-side working fluid pressure may be increased to a target working fluid pressure.

<Characteristics of Electromagnetic Linear Valve>

As described above, the electromagnetic linear valve 10 of the embodiment is characterized by a lap portion between the core 28 and the plunger 22, and hence the characteristics of the electromagnetic linear valve 10 will be described in detail with reference to FIG. 2, which is an enlarged cross-sectional view of the lap portion between the core 28 and the plunger 22.

As described before, in the electromagnetic linear valve 10, the upper end of the plunger 22 formed into a stepped shape faces and enters the recessed portion 72 of the core 28 formed into a stepped shape also in the state in which the plunger 22 is seated (the state in which no electric current is supplied to the coil 24). Specifically, the large outer diameter portion 78 faces and enters the first portion 74, and the small outer diameter portion 70 faces and enters the second portion 76. More specifically, in the electromagnetic linear valve 10, in a state in which the plunger 22 is seated, one of end surfaces of the small outer diameter portion 70 which is nearer to on the side of the core 28 opposes a bottom surface of the second recessed portion 74, and an opposed two-level surface, which is a two-level surface between the small outer diameter portion 70 and the large outer diameter portion 78 opposes the two-level surface of the recessed portion, which is a opposed two-level surface between the first portion 74 and the second portion 76, and further an outer peripheral surface of the small outer diameter portion 70 opposes an inner peripheral surface of the second portion 76, and an outer peripheral surface of the large outer diameter portion 78 opposes an inner peripheral surface of the first portion 74. That is, in the state in which the plunger 22 is seated, the electromagnetic linear valve 10 laps in the radial direction, but also laps constantly in the axial direction. In FIG. 2, the lapped portions described above are hatched in a netlike appearance.

The electromagnetic linear valve 10 is configured to have a relatively large radially opposing surface area Sr, which is a surface area of a portion of a side surface (an axially extending surface) of the plunger 22 which portion opposes the inner peripheral surface of the recessed portion 72 in the case where the plunger 22 is seated. Specifically, the electromagnetic linear valve 10 of the present invention has the radially opposing surface area Sr, which occupies approximately 37 percent of a total opposing surface area SA, which is a sum of an axially opposing surface area St, which is a surface area of a portion opposing a bottom surface of the recessed portion 72 in a radially extending surface (the direction at a right angle to the axial direction) of the plunger 22, and the radially opposing surface area Sr. In the electromagnetic linear valve 10, the radially opposing surface area Sr is a sum of a surface area Sr1 of a portion of the outer peripheral surface of the small outer diameter portion 70, which portion opposes the inner peripheral surface of the second portion 76 and a surface area Sr2 of a portion of the outer peripheral surface of the large outer diameter portion 78, which portion opposes the inner peripheral surface of the first portion 74. The axially opposing surface area St is a sum of a surface area St1 of a portion of the core-side end surface of the small outer diameter portion 70 which portion opposes the bottom surface of the second recessed portion 74, and a surface area St2 of a portion of the opposed two-level surface which opposes the recessed two-level surface.

Figure 5:
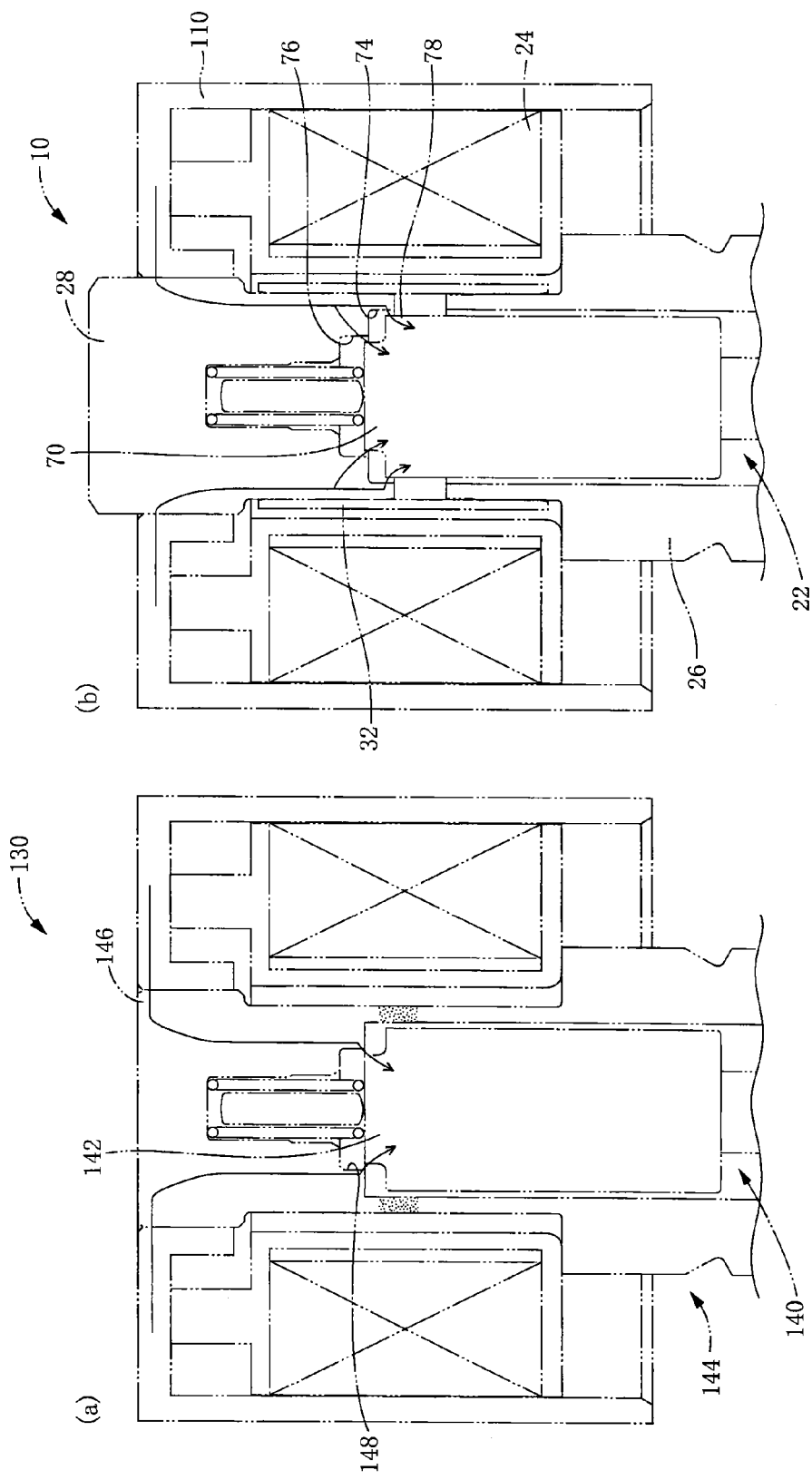
FIG. 5 is a schematic cross-sectional view for comparing the electromagnetic linear valve of the first embodiment and an electromagnetic linear valve of the related art.

The electromagnetic linear valve 10 is compared with an electromagnetic linear valve 130 of the related art in which a lower end portion of a core is not formed into a stepped shape. The electromagnetic linear valve 130 of a comparative example is in a state in which a small outer diameter portion 142 formed on an upper end of a plunger 140 faces and enters a recessed portion 148 formed on a core 146 of a housing 144 when the plunger 140 is seated as illustrated in FIG. 5(a). However, an outer peripheral surface of the small outer diameter portion 142 little laps an inner peripheral surface of the recessed portion 148, and the radially opposing surface area Sr is almost zero. In other words, in the electromagnetic linear valve 10, a radial component of the suction force from the state in which the plunger 22 is seated is increased, and a friction force between the plunger 22 and the housing 20 which depends on the radial component of the suction force is increased.

In the electromagnetic linear valve 130 of the comparative example, when an electric current is supplied to the coil, a magnetic flux flowing from the core 146 to the plunger 140 mainly flows from the recessed portion 148 of the core 146 to the small outer diameter portion 142 of the plunger 140. In contrast, in the electromagnetic linear valve 10, as illustrated in FIG. 5(b), the magnetic flux flowing from the core 28 to the plunger 22 mainly includes flows at two positions, namely, a flow from the first portion 74 of the core 28 to the large outer diameter portion 78 of the plunger 22 and a flow from the second portion 76 of the core 28 to the small outer diameter portion 70 of the plunger 22. Therefore, when the same amount of the magnetic flux flows from the coil to the core, the amount of the magnetic flux flowing from the core to the plunger of the electromagnetic linear valve 10 is larger than that of the electromagnetic linear valve 130 of the comparative example. That is, even when the amount of power distribution to the coil is the same, the suction force that the core 28 of the electromagnetic linear valve 10 sucks the plunger 22 is larger than a suction force of the electromagnetic linear valve 130 of the comparative example.

Figure 6:
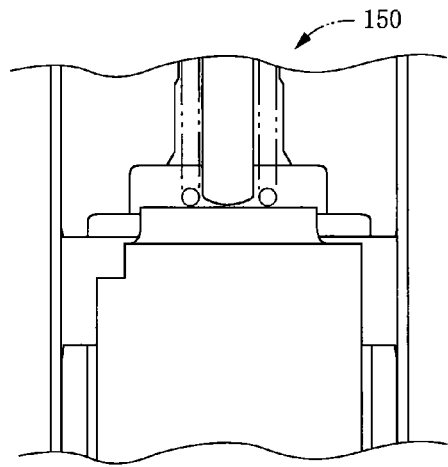
FIG. 6 is a schematic cross-sectional view of a plurality of electromagnetic linear valves different in ratio of a radially opposing surface area with respect to a total opposing surface area.
Figure 6:
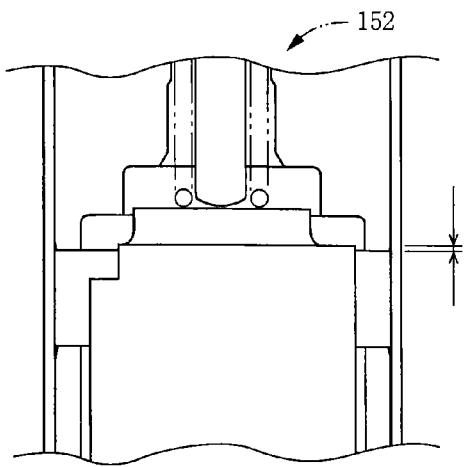
Figure 6:
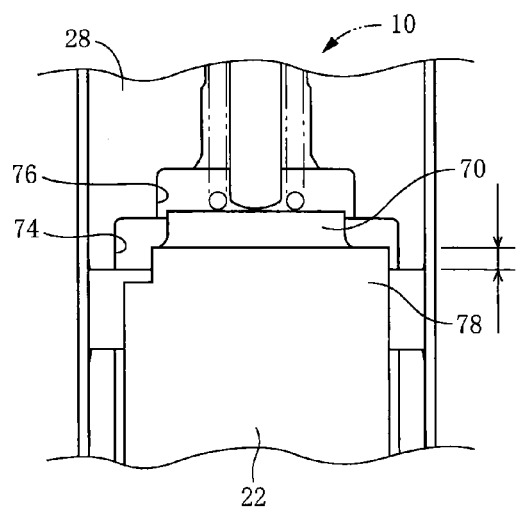
Figure 6:
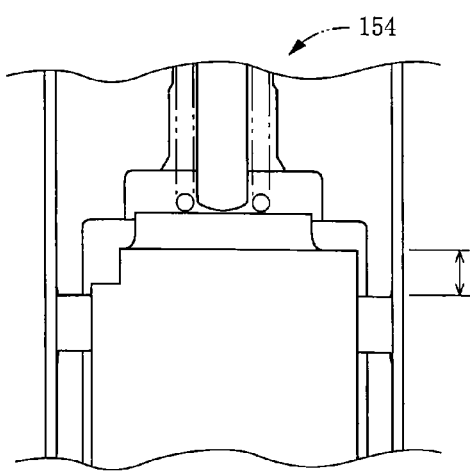

Subsequently, electromagnetic linear valves 10, 150, 152, 154 having different ratios (=Sr/SA) with respect to the total opposing surface area SA of the radially opposing surface area Sr different from each other are compared. FIG. 6 illustrates lapped portions between the core portion and the core opposing portions of the electromagnetic linear valves 10, 150, 152, 154 in an enlarged scale. As illustrated in FIG. 6, the electromagnetic linear valve 150 has a configuration in which the large outer diameter portion of the plunger and the first portion do not lap in a state in which the plunger is seated, and the ratio of the radially opposing surface area is 10 percent. The electromagnetic linear valve 152 has a configuration in which the ratio of the radially opposing surface area is set to 28%, and the electromagnetic linear valve 154 has a configuration in which the ratio of the radially opposing surface area is set to 46%.

Figure 7:
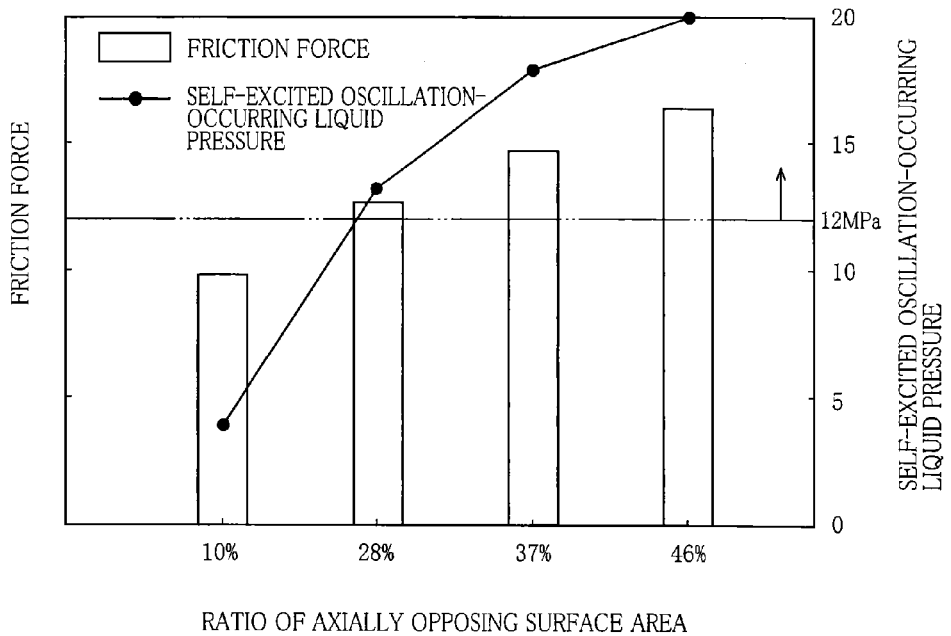
FIG. 7 is a graph showing magnitudes of friction forces in the plurality of electromagnetic linear valves illustrated in FIG. 6 and liquid pressures at which a self-excited oscillation occurs.

FIG. 7 shows that the magnitude of the friction force acting between the plunger and the housing, and a liquid pressure of the first liquid chamber 40 in the respective electromagnetic linear valves in the case where the self-excited oscillation occurs in the case where the electromagnetic linear valves are used as electromagnetic valves for pressure reduction. As illustrated in FIG. 7, the smaller the ratio of the radially opposing surface area, the lower the liquid pressure at which the self-excited oscillation occurs becomes. In other words, When the ratio of the radially opposing surface area is small, the self-excited oscillation occurs not only when the differential pressure is large, but also when the differential pressure is small. In other words, when the ratio of the radially opposing surface area is large, the self-excited oscillation occurs only when the differential pressure is large. Then, the liquid pressure at which the self-excited oscillation occurs is preferably 12 MPa or higher, and the ratio of the radially opposing surface area is preferably 25 percent or higher. However, since there may occur an error in the electromagnetic linear valve in the course of assembly, the ratio of the radially opposing surface area is preferably 30 percent or higher.

Figure 8:
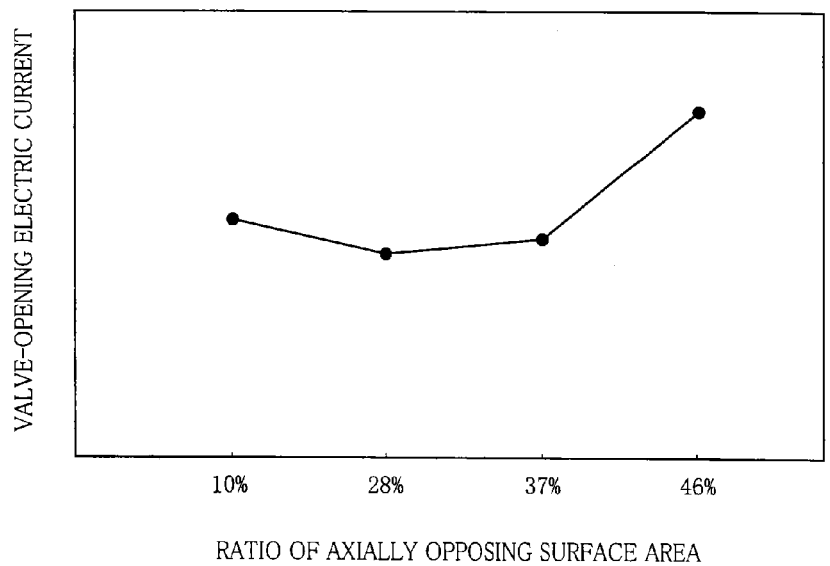
FIG. 8 is a graph showing magnitudes of valve-opening electric current in the plurality of electromagnetic linear valves illustrated in FIG. 6.

FIG. 8 illustrates magnitudes of a valve-opening electric current in the above-described plurality of electromagnetic linear valves. As illustrated in FIG. 8, it seems that when the ratio of the radially opposing surface area becomes too large, the magnetic force in the axial direction is not sufficient, and the valve-opening electric current is abruptly increased. Therefore, the ratio of the radially opposing surface area is preferably 45 percent or lower. As illustrated above, since there may occur an error in the electromagnetic linear valve in the course of assembly, the ratio of the radially opposing surface area is further preferably 40 percent or lower. In view of such circumstances, the electromagnetic linear valve 10 is set to have a ratio of the radially opposing surface area of 37 percent.

The housing 144 of the electromagnetic linear valve 130 of the related art is a member having a cylindrical shape closed on top and formed of a ferromagnetic material, and partly reformed into a ring shape having non-magnetism, and one end portion of the upper side of the portion reformed to have non-magnetism functions as a core portion. In contrast, the housing 20 of the electromagnetic linear valve 10 of the embodiment includes, as described above, the housing body 26 formed of a ferromagnetic material into a cylindrical shape, the closing member 28 formed of a ferromagnetic material and provided so as to close one end of the housing body 26 and function as a core portion, and the non-magnetic sleeve 32 as a coupling member configured to couple the housing body 26 and the closing member 28. In the electromagnetic linear valve 130 of the related art, part of the housing 144 formed of a single member is reformed to have a nonmagnetic property, fluctuations occur in the reformed portion. In contrast, in the electromagnetic linear valve 10, the closing member 28 which functions as the core portion is divided, and the radially opposing surface area Sr between the plunger 22 and the core 28 is set with high degree of accuracy.

In the electromagnetic linear valve, the plunger is moved toward the core in association with the suction of the plunger, and the small outer diameter portion of the plunger enters the portion of the core. The electromagnetic linear valve 130 of the comparative example is in a state in which the small outer diameter portion 142 of the plunger 140 faces and enters the recessed portion 148 of the core 146, while the electromagnetic linear valve 10 is in a state in which the large outer diameter portion 78 faces and enters the first portion 74 and the small outer diameter portion 70 faces and enters the second portion 76. In brief, only one portion of the plunger enters the core in the case of the electromagnetic linear valve 130 of the comparative example, while two portions enter in the case of the electromagnetic linear valve 10. Then, as illustrated in FIG. 2, the surface area of the portion where the outer peripheral surface of the small outer diameter portion 142 and the inner peripheral surface of the recessed portion 148 lap is increased in the electromagnetic linear valve 130 of the comparative example, while both of the surface area Sr1 of the portion of the outer peripheral surface of the small outer diameter portion 70 which opposes the inner peripheral surface of the second portion 76 and the surface area Sr2 of the portion of the outer peripheral surface of the large outer diameter portion 78 which opposes the inner peripheral surface of the first portion 74 are increased in the electromagnetic linear valve 10. In other words, the electromagnetic linear valve 10 has a configuration in which the amount of the magnetic flux flowing from the core 28 to the plunger 22 is increased with increase in an amount of upward stroke of the plunger 22, and the amount of increase of the magnetic flux from the core to the plunger with respect to the amount of stroke is larger in the case of the electromagnetic linear valve 10 of the embodiment than that of the electromagnetic linear valve 130 of the comparative example. Therefore, the radial component of the suction force of the electromagnetic linear valve 10 is larger than that of the electromagnetic linear valve 130 of the comparative example, and the friction force between the plunger 22 and the housing 20 is increased. As described thus far, the electromagnetic linear valve 10 is capable of suppressing the self-excited oscillation of the plunger 22 effectively by an action of a large friction force depending on the radial component of the suction force even during the movement of the plunger 22. In the electromagnetic linear valve 10, the ratio Sr/SA with respect to the total opposing surface area SA of the radially opposing surface area Sr is 58 percent and the radially opposing surface area Sr becomes larger than the axially opposing surface area St in the case where an electric current is supplied to the coil 24 and the plunger 22 approaches most to the core 28.

In addition, as described before, the electromagnetic linear valve 10 of the embodiment has a configuration in which the core-opposing portion has different-clearance portions and the clearance in the radial direction at a position where the void portion 120 is formed is larger than the clearances of other portions. In other words, as illustrated in FIG. 3, the magnetic force acting on the portion of the plunger 22 where the void portion 120 is formed is smaller than the magnetic force acting on a portion on the side opposite to the void portion 120 with respect to the axial line. Then, in the electromagnetic linear valve 10, when the electric current is supplied to the coil 24, the plunger 22 is inclined in the housing 20 so that the portion where the void portion 120 is formed moves away from the inner peripheral surface of the first portion 74 by the existence of the different-clearance portion. Therefore, in the electromagnetic linear valve 10, the direction in which the plunger 22 is inclined in the housing 20 is fixed, and hence the magnetic field to be generated when the electric current is passed to the coil 24 is stabilized. According to the electromagnetic linear valve 10, the friction force between the housing 20 and the plunger 22 is stabilized, and the stabilized friction force can effectively suppress the self-excited oscillation of the plunger 22.

<Modification>

Figure 9:
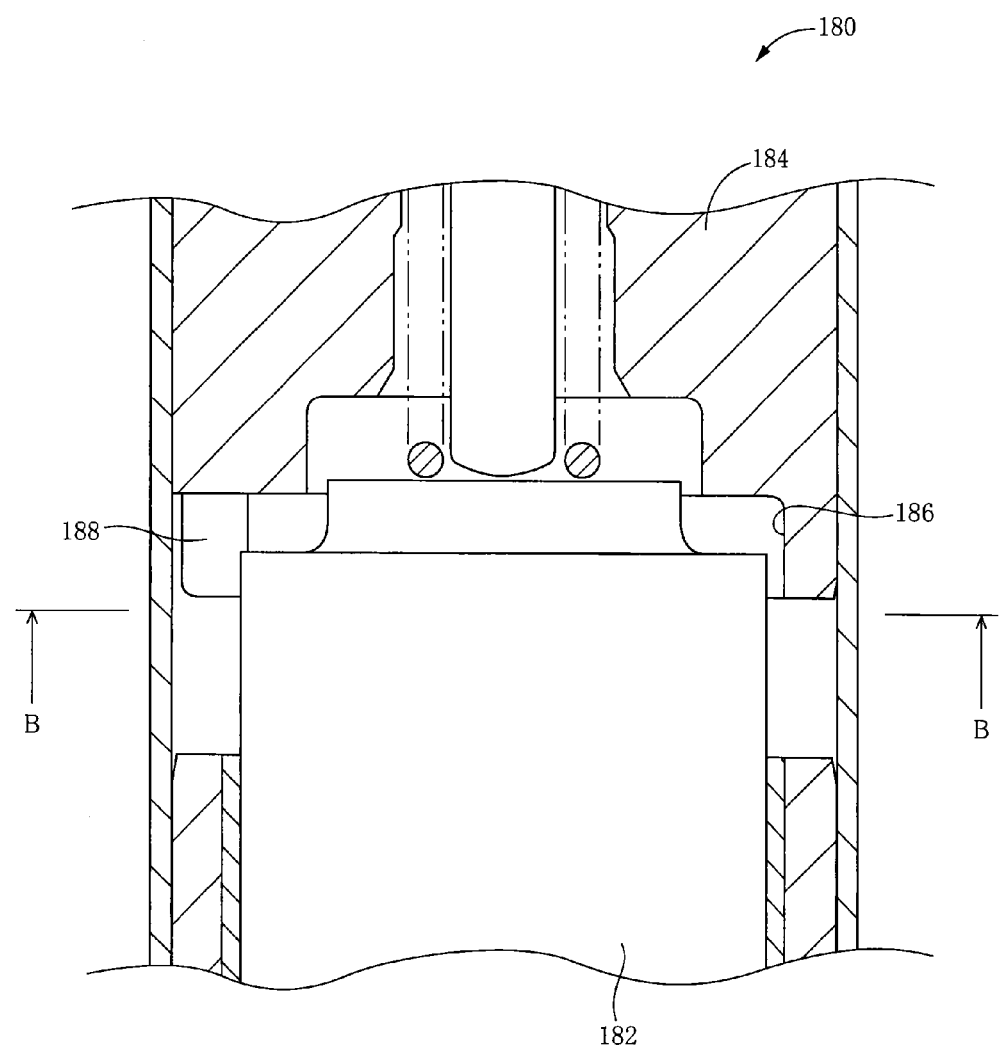
FIG. 9 is a cross-sectional front view illustrating a portion in which a core portion and core-opposing portions oppose in an electromagnetic linear valve of a modification in an enlarged scale.
Figure 10:
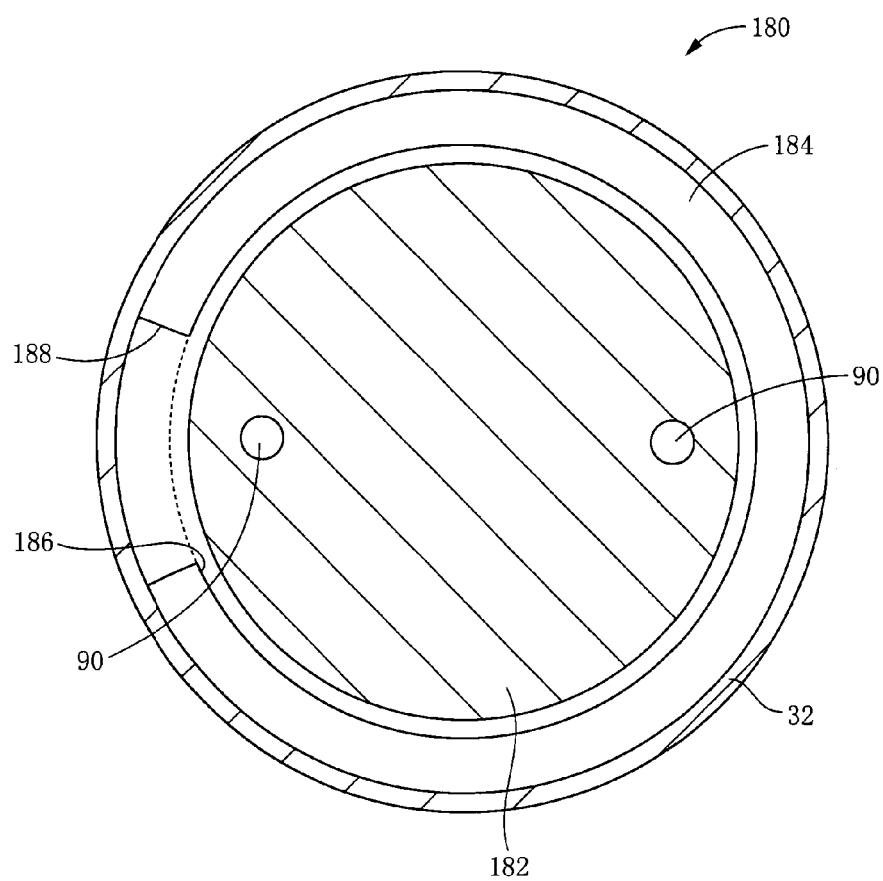
FIG. 10 is a cross-sectional plan view (a B-B cross section in FIG. 9) of the electromagnetic linear valve of a modification.
Figure 11:
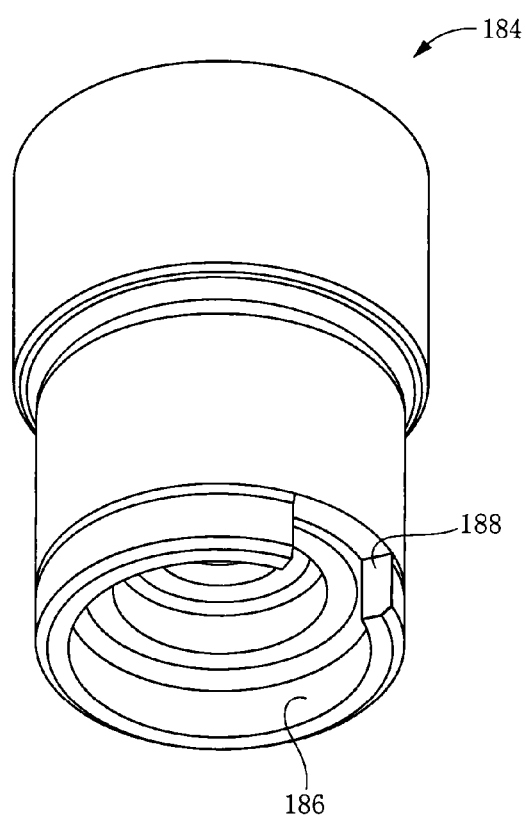
FIG. 11 is a perspective view of a core in FIG. 9.

In the electromagnetic linear valve 10 of the above-described embodiment, the different-clearance portion is provided on the core-opposing portion of the plunger 22. However, in an electromagnetic linear valve 180 of a modification illustrated in FIG. 9 to FIG. 11, the different-clearance portion is provided on the core portion. FIG. 9 is a cross-sectional front view of a portion in which the core portion and the core-opposing portions oppose in the electromagnetic linear valve 180 of the modification illustrating in an enlarged manner, FIG. 10 is a cross-sectional plan view (B-B cross section in FIG. 9), and FIG. 11 is a perspective view of the core.

The electromagnetic linear valve 180 of the modification has substantially the same configuration as the electromagnetic linear valve 10 of the above-described embodiment. However, a plunger 182 is not formed with a void portion, and a first portion 186 of a core 184 is formed with a void portion 188 like a cutout formed in the first recessed portion 186. In other words, in the electromagnetic linear valve 180 of the modification as well, a magnetic force acting between a portion where the void portion 188 is formed and the plunger 182 is set to be smaller than a magnetic three acting between other portion and the plunger 182. Then, in the electromagnetic linear valve 180 of the modification as well, the plunger 182 is inclined in the housing 20 so as to move away from the portion where the void portion 188 of the first portion 186 is formed by the existence of the different-clearance portion. Therefore, according to the electromagnetic linear valve 180 of the modification, in the same manner as the electromagnetic linear valve 10 of the embodiment described above, effective suppression of the self-excited oscillation of the plunger 182 may be enabled by the stable friction force.

Second Embodiment

Figure 12:
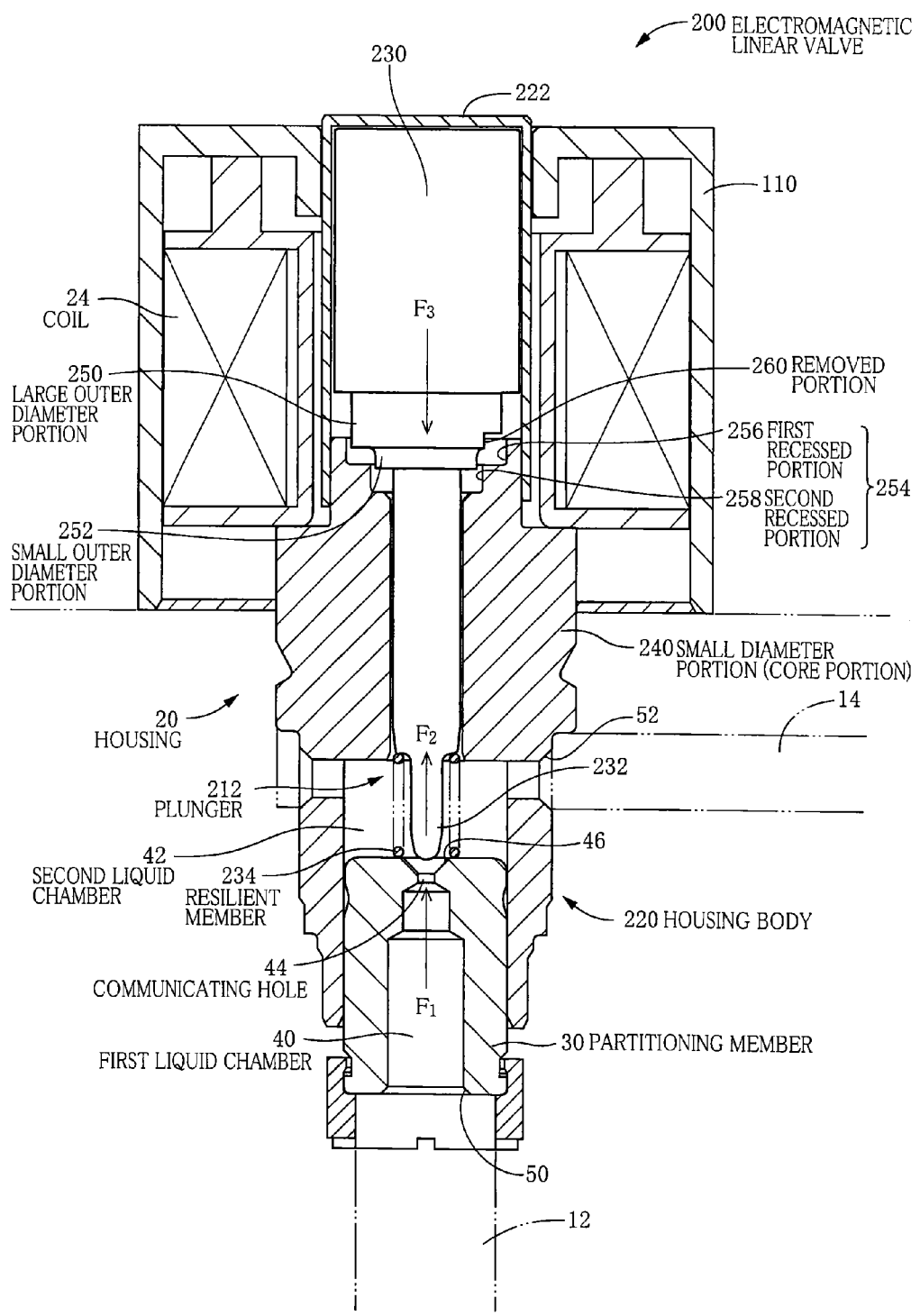
FIG. 12 is across-sectional front view of an electromagnetic linear valve according to a second embodiment of a claimable invention.

The electromagnetic linear valve 10 of the first embodiment described above is a normally closed valve. In contrast, an electromagnetic linear valve 200 of a second embodiment is a normally opened valve. The electromagnetic linear valve 200 of the second embodiment will be described with reference to a cross-sectional front view in FIG. 12 in detail. In the description of the electromagnetic linear valve 200 of the embodiment, the same reference numerals as used in the electromagnetic linear valve 10 of the first embodiment are used to designate the corresponding elements, and the description thereof is omitted or simplified.

The electromagnetic linear valve 200 of this embodiment includes a housing 210 and a plunger 212 provided in the housing 210 so as to be movable in the axial direction in the same manner as the electromagnetic linear valve 10 of the first embodiment. The housing 210 includes a guide cylinder 220 formed into a substantially cylindrical shape as a housing body configured to guide the movement of the plunger 212 in the axial direction in the interior thereof, a sleeve 222 provided so as to close an upper end of the guide cylinder 220 and having a cylindrical shape closed on top, and the valve member 30 having a cylindrical shape closed on top and fitted to a lower end portion of the guide cylinder 220. The guide cylinder 220 is formed of a ferromagnetic material, and the sleeve 222 is formed of a non-magnetic material.

The plunger 212 includes a plunger body 230 formed of a ferromagnetic material and a rod 232 formed of a non-magnetic material and fixedly fitted to a lower end of the plunger body 230. The plunger 212 is urged in the direction away from the valve member 30, specifically, from the opening 46 of the communicating hole 44 (upper direction) by a coil spring 234 disposed between the plunger 212 and the valve member 30. The guide cylinder 220 described above is formed with a small diameter portion 240 which allows insertion of the rod 232 of the plunger 212. In contrast, the plunger body 230 has an outer diameter larger than an inner diameter of the small diameter portion 240, and is configured such that an upper end surface of the small diameter portion 240 opposes a lower end surface of the plunger body 230. Then, when an electric current is supplied to the coil 24, a magnetic flux passes through the guide cylinder 220, the plunger 212, and the coil case 110 in association with the generation of the magnetic field. Then, a magnetic force which encourages the plunger 212 to move in the direction in which a distal end of the rod 232 approaches the opening 46 of the communicating hole 44 is generated. That is, the small diameter portion 240 functions as a core portion which mainly generates a force that attracts the plunger 212 when the electric current is supplied to the coil 24, and a lower end portion of the plunger body 230 functions as a core-opposing portion.

The lower end portion of the plunger body 230 is formed into a stepped shape. Specifically, the plunger body 230 includes a large outer diameter portion 250 at a lower end thereof, and a small outer diameter portion 252 on the lower side of the large outer diameter portion 250, so that a stepped shape is formed. In contrast, an upper end of the guide cylinder 220 is provided with a recessed portion 254 formed into a stepped shape. Specifically, the recessed portion 254 includes a first portion 256 on an upper end surface of the guide cylinder 220, and a second portion 258 having an inner diameter smaller than the first portion 256 is formed below the first portion 256, so that a stepped shape is formed. Then, the recessed portion 254 of the guide cylinder 220 allows the lower end portion of the plunger body 230 to face and enter thereto. Specifically, the small outer diameter portion 252 of the plunger body 230 faces and enters the second portion 258, and large outer diameter portion 250 of the plunger body 230 faces and enters the first portion 256.

In the electromagnetic linear valve 200 of this embodiment, the lower end of the plunger body 230 formed into a stepped shape faces and enters the recessed portion 254 of the guide cylinder 220 formed into a stepped shape also in the case where the plunger body 230 as the core-opposing portion is farthest from the guide cylinder 220 as the core portion (in the state in which no electric current is supplied into the coil 24). Specifically, in the electromagnetic linear valve 200, in the state in which no electric current is supplied to the coil 24, not only a lower surface of the small outer diameter portion 252 opposes a bottom surface of the second portion 258 and an opposed two-level surface which is a two-level surface between the small outer diameter portion 252 and the large outer diameter portion 250 opposes a recessed two-level surface which is a two-level surface between the first portion 256 and the second portion 258, but also an outer peripheral surface of the small outer diameter portion 252 opposes an inner peripheral surface of the second portion 258 and an outer peripheral surface of the large outer diameter portion 250 opposes an inner peripheral surface of the first portion 256. That is, the electromagnetic linear valve 200 is configured to not only lap in the radial direction, but also lap constantly in the axial direction in the same manner as the electromagnetic linear valve 10 of the first embodiment in the state in which no electric current is supplied to the coil 24.

Then, the electromagnetic linear valve 200 of the present invention includes the radially opposing surface area Sr which corresponds to approximately 37 percent of the total opposing surface area SA in the state in which no electric current is supplied to the coil 24. Also, in a state in which an electric current is supplied to the coil 24 and the plunger 212 is seated, the ratio of the radially opposing surface area Sr with respect to the total opposing surface area SA becomes 55 percent, so that the radially opposing surface area Sr becomes larger than the axially opposing surface area St. Therefore, the electromagnetic linear valve 200 of the embodiment is set to have a large friction force between the plunger 212 and the housing 210 which depends on the radial component of a suction force in the same manner as the electromagnetic linear valve 10 of the first embodiment, and the self-excited oscillation of the plunger 212 can be suppressed effectively.

In the electromagnetic linear valve 200, the large outer diameter portion 250 of the plunger 212 is formed with a void portion 260 shaped like a cutout formed in a circle, and the core-opposing portion of the plunger 212 has a different-clearance portion. In other words, in the electromagnetic linear valve 200 of the embodiment, in the same manner as the electromagnetic linear valve 10 of the first embodiment, the direction of inclination of the plunger 222 in the housing 210 is determined, and the friction force between the housing 210 and the plunger 212 is stabilized, and the self-excited oscillation of the plunger 212 may be suppressed effectively by the stabilized friction force.

Reference Signs List

10: electromagnetic linear valve, 12: high-pressure-side working fluid channel, 14: low-pressure-side working fluid channel, 20: housing, 22: plunger, 24: coil, 26: guide cylinder [housing body], 28: closing member [core portion], 30: valve member [partitioning member], 32: sleeve [coupling member], 40: first liquid chamber, 42: second liquid chamber, 46: opening (valve seat), 50: opening [inlet port], 52: opening [outlet port], 60: plunger body, 62: rod, 64: coil spring [resilient member], 70: small outer diameter portion, 72: recessed portion, 74: first recessed portion, 76: second recessed portion, 78: large outer diameter portion, 120: void portion [different-clearance portion], 180: electromagnetic linear valve, 182: plunger, 184: core, 186: first recessed portion, 188: void portion [different-clearance portion], 200: electromagnetic linear valve, 210: housing, 212: plunger, 220: guide cylinder, 230: plunger body, 232: rod, 234: coil spring [resilient member], 240: small diameter portion [core portion], 250: large outer diameter portion, 252: small outer diameter portion, 254: recessed portion, 256: first recessed portion, 258: second recessed portion

The invention claimed is:
1. An electromagnetic linear valve comprising:
a housing including: (A) a partitioning member configured to partition the interior of the housing into a first liquid chamber and a second liquid chamber and being formed with a communicating hole communicating the first liquid chamber and the second liquid chamber with each other; (B) an inlet port communicating with the first liquid chamber and configured to allow working fluid to flow into the first liquid chamber; and (C) an outlet port communicating with the second liquid chamber to allow working fluid to flow out from the second liquid chamber;
a plunger disposed in the second liquid chamber and movable in the axial direction such that one end of the plunger is seated in an opening of the communicating hole;
a resilient member configured to urge the plunger in one of a direction in which the one end approaches the opening of the communicating hole and a direction in which the one end is moved away from the opening; and
a coil disposed around the housing and configured to generate a magnetic field for moving the plunger in a direction opposite to the direction in which the plunger is urged by the resilient member, wherein
the housing includes a core portion formed of a ferromagnetic material and defining part of the second liquid chamber,
the plunger includes a core-opposing portion opposing the core portion and allowing a magnetic flux to flow between the core portion and the core-opposing portion,
the core portion includes a recessed portion which allows the core-opposing portion to face and enter therein,
the core-opposing portion opposes a bottom surface of the recessed portion and opposes an inner peripheral surface of the recessed portion,
the resilient member is configured to urge the plunger in a direction in which the core-opposing portion moves away from the core portion, and allow the plunger to move in a direction in which the core-opposing portion approaches the core portion against an urging force of the resilient member when an electric current is supplied to the coil,
an outer surface of the core-opposing portion has (A) a first axially-extending surface radially opposing a second axially-extending surface of the inner peripheral surface of the recessed portion, and (B) a first radially-extending surface axially opposing a second radially-extending surface of the bottom surface of the recessed portion, and a first area between the first-axially-extending surface and the second axially-extending surface is smaller than a second area between the first radially-extending surface and the second radially-extending surface when no electric current is supplied to the coil, and the first area becomes larger than the second area when the electric current is supplied to the coil and the core-opposing portion approaches most to the core portion,
the core-opposing portion is formed into a stepped shape having a large outer diameter portion and a smaller outer diameter portion having an outer diameter smaller than that of the large outer diameter portion, the small outer diameter portion being located on one of opposite sides of the large outer diameter portion which is nearer to the core portion, the recessed portion of the core portion has a stepped shape and is formed with a first recessed portion and a second recessed portion, the second recessed portion being located on an opposite side of the first recessed portion from the core-opposing portion, and a void portion is formed on the large outer diameter portion of the core-opposing portion such that a radial clearance between an inner peripheral surface of the first recessed portion and an outer peripheral surface of a first part of the large outer diameter portion is different from a radial clearance between the inner peripheral surface of the first recessed portion and an outer peripheral surface of a second part of the large outer diameter portion, the void portion being formed on one of the first part and the second part of the large outer diameter portion.

2. The electromagnetic linear valve according to claim 1, wherein
the first area occupies 30 percent or higher of a sum of the first area and the second area when no electric current is supplied to the coil.

3. The electromagnetic linear valve according to claim 2, wherein
the first area occupies 40 percent or lower of a sum of the first area and the second area when no electric current is supplied to the coil.

4. The electromagnetic linear valve according to claim 1, wherein
the first area occupies 60 percent or lower of a sum of the first area and the second area when the electric current is supplied to the coil and the core-opposing portion approaches most to the core portion.

5. The electromagnetic linear valve according claim 1, wherein
the large outer diameter portion faces and enters the first recessed portion, and the small outer diameter portion faces and enters the second recessed portion,
when no electric current is supplied to the coil, an opposed two-level surface, which is a two-level surface between the large outer diameter portion and the small outer diameter portion, opposes a recessed two-level surface, which is a two-level surface between the first recessed portion and the second recessed portion,
when no electric current is supplied to the coil, an end surface of the small outer diameter portion which is nearer to the core portion opposes a bottom surface of the second recessed portion, and the outer peripheral surface of the large outer diameter portion opposes the inner peripheral surface of the first recessed portion, and an outer peripheral surface of the small outer diameter portion opposes an inner peripheral surface of the second recessed portion,
the outer peripheral surface of the large outer diameter portion has a portion opposing the inner peripheral surface of the first recessed portion, and the outer peripheral surface of the small outer diameter portion has a portion opposing the inner peripheral surface of the second recessed portion, and the first area is a sum of a surface area of the portion of the outer peripheral surface of the large outer diameter portion and a surface area of the portion of the outer peripheral surface of the small outer diameter portion, and
the opposed two-level surface has a portion opposing the recessed two-level surface, and the end surface of the small outer diameter portion which is nearer to the core portion has a portion opposing the bottom surface of the second recessed portion, and the second area is a sum of a surface area of the portion of the opposed two-level surface axially opposing the two-level surface and a surface area of the portion of the end surface of the small outer diameter portion axially opposing the bottom surface of the second recessed portion.

6. The electromagnetic linear valve according to claim 1, wherein
the housing includes: (a) a housing body formed of a ferromagnetic material and formed into a cylindrical shape, (b) a closing member formed of a ferromagnetic material and provided so as to close one end of the housing body, and (c) a coupling member formed of non-magnetic material into a cylindrical shape, and configured to couple the housing body and the closing member with a distance secured between the housing body and the closing member by allowing the housing body to be fitted to one end thereof and the closing member to be fitted to the other end thereof,
the closing member partitions the second liquid chamber on an opposite side from a portion partitioned by the partitioning member and functions as the core portion, and
the other end of the plunger on an opposite side thereof from the one end functions as the core-opposing portion.

7. The electromagnetic linear valve according to claim 1, wherein the core-opposing portion has a cross sectional shape that is asymmetric with respect to an axial line of the core-opposing portion, and the cross sectional shape is taken along a plane including the axial line and the void portion.

8. An electromagnetic linear valve comprising:
a housing including: (A) a partitioning member configured to partition the interior of the housing into a first liquid chamber and a second liquid chamber and being formed with a communicating hole communicating the first liquid chamber and the second liquid chamber with each other; (B) an inlet port communicating with the first liquid chamber and configured to allow working fluid to flow into the first liquid chamber; and (C) an outlet port communicating with the second liquid chamber to allow the working fluid to flow out from the second liquid chamber;
a plunger disposed in the second liquid chamber and movable in the axial direction such that one end of the plunger is seated in an opening of the communicating hole;
a resilient member configured to urge the plunger in one of a direction in which the one end approaches the opening of the communicating hole and a direction in which the one end is moved away from the opening; and
a coil disposed around the housing and configured to form a magnetic field for moving the plunger in a direction opposite to the direction in which the plunger is urged by the resilient member, wherein
the housing includes a core portion formed of a ferromagnetic material and defining part of the second liquid chamber,
the plunger includes a core-opposing portion opposing the core portion and allowing a magnetic flux to flow between the core portion and the core-opposing portion,
the core portion includes a recessed portion which allows the core-opposing portion to face and enter therein,
the core-opposing portion opposes a bottom surface of the recessed portion and opposes an inner peripheral surface of the recessed portion, the core-opposing portion is formed into a stepped shape having a large outer diameter portion and a small outer diameter portion having an outer diameter smaller than that of the large outer diameter portion, the small outer diameter portion being located on one of opposite sides of the large outer diameter portion which is nearer to the core portion, the recessed portion of the core has a stepped shape and is formed with a first recessed portion and a second recessed portion, the second recessed portion being located on an opposite side of the first recessed portion from the core-opposing portion, a void portion is formed on the first recessed portion of the core portion such that a radial clearance between an inner peripheral surface of a first part of the first recessed portion and an outer peripheral surface of the large outer diameter portion is different from a radial clearance between an inner peripheral surface of a second part of the first recessed portion and the outer peripheral surface of the large outer diameter portion, the void portion being formed on one of the first part and the second part of the first recessed portion.

9. The electromagnetic linear valve according to claim 8, wherein the core portion has a cross sectional shape that is asymmetric with respect to an axial line of the core portion, and the cross sectional shape is taken along a plane including the axial line and the void portion.

10. The electromagnetic linear valve according to claim 8, wherein the void portion has a configuration in which a dimension of the circumferential direction thereof is 10 percent or higher of the inner periphery of the recessed portion when being provided on the core portion, and is 10 percent or higher of the outer periphery of the core-opposing portion when being provided on the core-opposing portion.

* * * * *